Sept. 13, 1932.  W. A. GEIGER  1,876,908
FRICTION SHOCK ABSORBING MECHANISM
Filed April 28, 1930
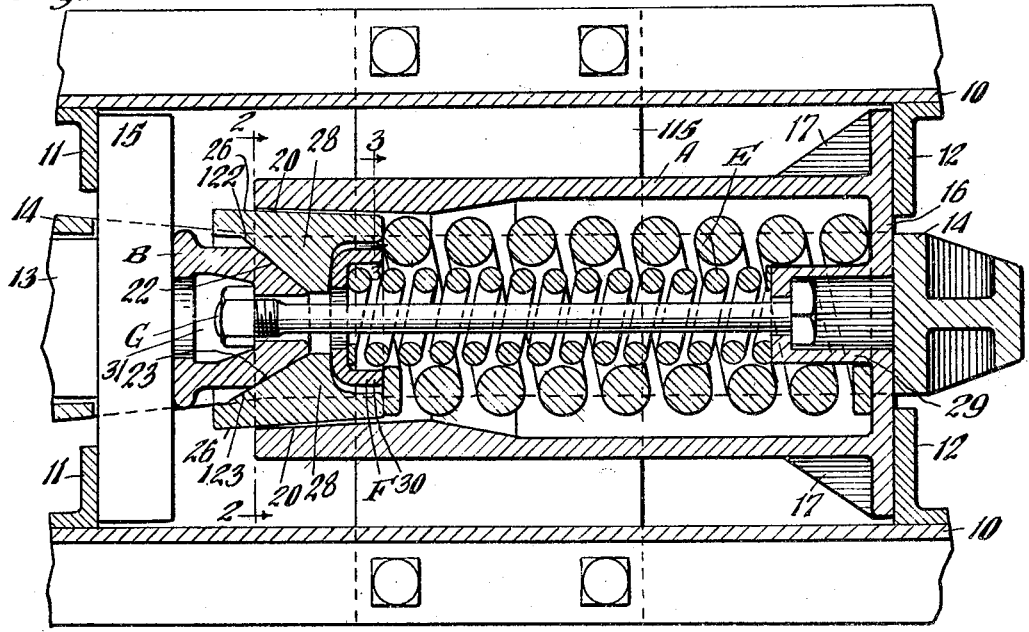
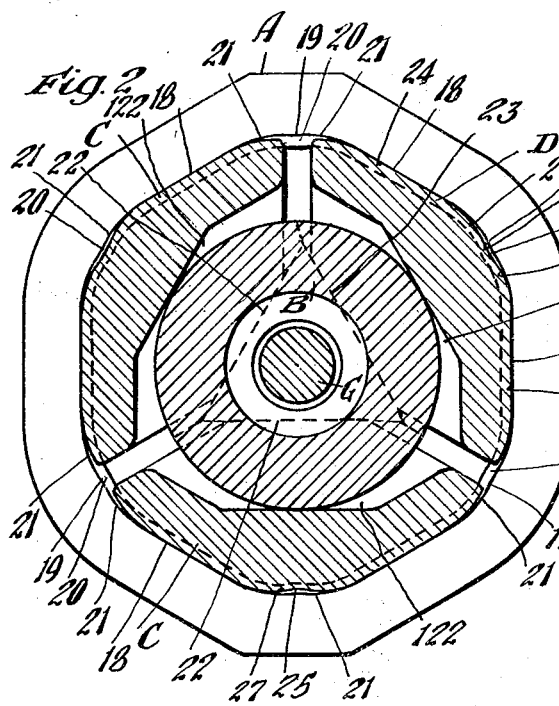
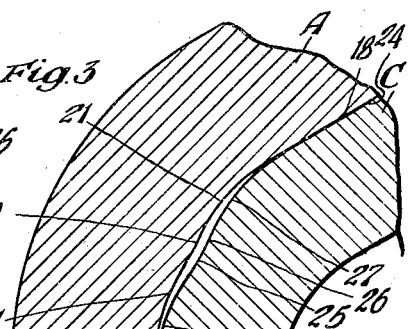
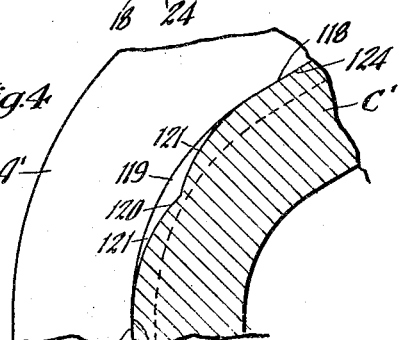
Inventor
William A. Geiger
By Joseph Harris
His Atty.

Patented Sept. 13, 1932

1,876,908

UNITED STATES PATENT OFFICE

WILLIAM A. GEIGER, OF CHICAGO, ILLINOIS, ASSIGNOR TO W. H. MINER, INC., OF CHICAGO, ILLINOIS, A CORPORATION OF DELAWARE

FRICTION SHOCK ABSORBING MECHANISM

Application filed April 28, 1930. Serial No. 447,913.

This invention relates to improvements in friction shock absorbing mechanisms especially adapted for railway cars.

One object of the invention is to provide in that type of friction shock absorbing mechanism wherein a substantially tubular friction shell is employed having a plurality of spring resisted friction shoes movable lengthwise of the shell and cooperating with the friction surfaces thereof to produce high frictional resistance and wedge means cooperating with the shoes for forcing the same into frictional contact with the shell, such an arrangement and construction of cooperating shell and shoes and wedge means that the shoes are properly guided for movement lengthwise of the shell and creeping or displacement of the shoes circumferentially of the shell is positively prevented and the pressure of the wedge means is equalized to insure uniform distribution of the stresses in the shell and to obtain maximum strength against bursting for a shell of given size and thickness of metal.

A more specific object of the invention is to provide a friction shock absorbing mechanism of the character indicated in the preceding paragraph wherein the friction shell is of hexagonal, interior cross section, presenting six longitudinally disposed interior, flat friction surfaces, with which three friction shoes cooperate and each shoe has a pair of flat friction surfaces disposed angularly with respect to each other and cooperating with an adjacent pair of shell surfaces, and wherein the shell friction surfaces are converged inwardly, the interior surface portions of the shell at the junction of the friction surfaces of each pair being curved and the surface portion of the cooperating shoe at the junction of the pair of surfaces thereof being so arranged as to provide clearance between the shoe and shell surfaces at such junctions throughout the length of the shell, whereby true surface contact between the friction surfaces of the shell and shoes is assured at all times during the entire compression stroke of the mechanism and all danger of contact of the shoes and shell at the junctions of the friction surfaces is entirely eliminated, thereby avoiding damage to the shell through cutting, gouging and scoring at the junctions of the pairs of friction surfaces.

A still further object of the invention is to provide a mechanism of the character indicated wherein the shell walls are strengthened at the junctions of the friction surfaces thereof by thickening the walls of the shell at such points by convex projecting surface portions.

Other objects of the invention will more clearly appear from the description and claims hereinafter following.

In the drawing, forming a part of this specification, Figure 1 is a horizontal, sectional view through the underframe structure of a railway car at one end thereof, illustrating my improvements in connection therewith. Figure 2 is a transverse, sectional view on an enlarged scale corresponding substantially to the line 2—2 of Figure 1. Figure 3 is a transverse, sectional view on a still larger scale, corresponding substantially to the line 3—3 of Figure 1, part only of the friction shell and shoes being shown. And Figure 4 is a view similar to Figure 2 on an enlarged scale illustrating another embodiment of the invention, showing a portion of the friction shell and a portion of one of the shoes only.

Referring first to the embodiment of the invention illustrated in Figures 1, 2 and 3, 10—10 designate spaced center or draft sills of a railway car underframe, to the inner sides of which are secured the usual front stop lugs 11—11 and rear stop lugs 12—12. The inner end portion of the coupler shank is designated by 13 and a hooded yoke 14 of well known form is connected thereto. My improved shock absorbing mechanism proper and a front main follower 15 are disposed within the yoke and the yoke in turn is supported by a detachable saddle plate 115 fixed to the bottom flanges of the spaced draft sills 10.

My improved friction shock absorbing mechanism comprises broadly a combined friction shell and spring cage A; a main wedge block B; three friction shoes C—C and D; a main spring resistance E; a spring follower cap F, and a retainer bolt G.

The combined friction shell and spring cage casting A is of substantially hexagonal, transverse cross section, as clearly illustrated in Figure 2, and has the friction shell section formed at the forward end thereof. At the rear end, the casting is provided with a transverse wall 16, which protrudes laterally beyond the side walls of the casting proper and cooperates with the stop lugs 12—12 in the manner of the usual rear follower. The end wall 16 is suitably reinforced by webs 17—17 which, as clearly shown in Figure 1, are formed integral with the projecting portions of said end wall and the side wall members of the casting. The friction shell section of the casting A is provided with six interior, substantially flat friction surfaces 18—18, which are spaced symmetrically about the longitudinal axis of the mechanism and converge inwardly of the shell. Each pair of adjacent friction shell surfaces 18—18 is separated by a surface portion 19, which is co-extensive in length with the surfaces 18—18. Each surface 19 has a convex portion 20 which merges with the two adjacent, flat friction surfaces 18—18, the merging portions being in the form of concave sections 21—21 which coalesce with the flat surfaces and the convex surface 20. Inasmuch as each two adjacent friction shell surfaces 18—18 converge inwardly, these surfaces are separated a lesser distance at their inner than at their outer ends. The projecting convex surface portions which separate each adjacent pair of friction shell surfaces 18 are of a curvature of greater radius at the inner ends of the friction surfaces than at the outer ends thereof and the concave surface portions 21—21 are of less curvature at the inner end of the shell than at the outer end thereof, as clearly illustrated in Figures 2 and 3, and the centers of said surfaces 21—21 are coaxial. The radius of curvature of the surface 20 gradually and uniformly increases and the radius of curvature of the surfaces 21—21 gradually and uniformly diminishes from the outer to the inner end of the shell.

The wedge block C has a flat, front end face which bears directly on the inner side of the main follower 15. At the inner end, the wedge block is provided with three flat wedge faces 22—22 and 23 which are arranged symmetrically about the longitudinal axis of the wedge block. The faces 22—22 are disposed at a relatively blunt angle with respect to the longitudinal axis of the mechanism, while the face 23 is disposed at a relatively keen wedging angle to said axis.

The friction shoes are three in number, and are of similar design, except as hereinafter pointed out. Each shoe is provided with a pair of angularly disposed, longitudinally extending, flat friction surfaces 24—24 on the outer side thereof, which have flat frictional contact with one of the pairs of friction surfaces 18—18 of the friction shell. The friction surfaces 24—24 of each shoe are separated by an intermediate, indented surface portion 25. As shown, the surface portion 25 of each shoe is composed of a longtiudinally extending concave surface portion 26 merging with the two flat surfaces 24—24, the merging surface portions being of convex form and indicated by 27—27. The surface portions 27—27 coalesce with the concave surface portion 26 and the flat surfaces 24—24, as clearly illustrated in Figure 2. The curved surface portions 26 and 27—27 of each shoe are of uniform radius throughout the length of said shoe. As will be clear upon reference to Figure 2, the radius of curvature of the surface portions 27—27 of each shoe is less than the radius curvature of the concave surface portions 21—21 between the corresponding portion of shell friction surfaces 18—18 at the rear end of the shell and the centers of curvatures of said surfaces 27—27 are so located that a substantial amount of clearance is provided between the indented surface portion 26 of each shoe and the corresponding surface portion separating the shell friction surfaces 18—18 with which said shoe cooperates. Inasmuch as the separating curved surfaces of each pair of shell friction surfaces 18—18 are of lesser radius at the inner end than at the outer end of the shell, the indented surfaces 26 at the inner ends of the shoes will be spaced a greater distance from the corresponding shell surface portions and the opposed surfaces of the friction shoes and friction shell at this point will separate to a greater extent as the shoes are moved inwardly on the converging shell friction surfaces, thereby entirely eliminating contact between the shoes and shell friction surfaces at the points where the pairs of surfaces of the shoes and the pairs of adjacent shell surfaces merge, thereby eliminating all danger of damage to the shell by cutting or scoring.

On the inner side, each friction shoe is provided with an enlargement 28 having a wedge face on the forward side thereof, the wedge faces of the shoes C—C being designated by 122—122 and the wedge face of the shoe D being desiginated by 123. The wedge faces 122—122 of the shoes C—C are correspondingly inclined to and cooperate with the wedge faces 22—22 of the wedge block B, while the wedge face 123 of the shoe D is correspondingly inclined to and cooperates with the wedge face 23 of said wedge block.

The main spring resistance E comprises a relatively light inner coil and a heavier outer coil, the inner coil having the inner end thereof bearing directly on an inwardly projecting hollow boss 29 provided on the end wall 16 of the casting and the front end thereof bearing on the spring follower cap F, which in turn bears on the inner ends of the enlargements 28—28 of the friction shoes. The outer or larger coil of the spring resistance has the front end thereof bearing directly on the inner ends of the shoes and an annular flange portion 30 of the spring follower cap and the rear end thereof surrounding the hollow boss 29 and bearing on the end wall 16 of the casting.

The retainer bolt G has its opposite ends anchored respectively to the wedge block B and the hollow boss 29 of the casting, the head of the bolt being disposed within said hollow boss and the shank thereof extending through alined openings in said boss, the spring follower cap F and the wedge block B. The nut of the bolt is accommodated within an opening 31 provided in said wedge block. The retainer bolt in addition to holding the mechanism assembled also provides means for maintaining the uniform overall length of the same. Compensation for wear of the various friction and wedge faces of the mechanism is had by the expansive action of the main spring resistance E, which is placed under initial compression when the mechanism is assembled.

In my improved construction, by the angular arrangement of the flat friction faces of the shell and each shoe, respectively, a combined friction surface is formed which absolutely prevents any circumferential shift of the shoes, which is a very important consideration in connection with friction gears of the friction shell type. It is further pointed out that the three shoe arrangement in conjunction with the three faced wedge insures equalized, radially, outwardly directed forces on the three shoes and also that each shoe in effect has wedging action against the friction shell. This wedging action of the shoes serves to positively insure uniform stresses in the shell since it will be obvious that each diametrically opposite and parallel set of sections of the shell will be pressed apart and thus prevent distortion of the shell and any excessive stresses in any particular section of the shell.

In my improved construction, full area contact between the friction surfaces of the shoes and shell is maintained on the converged friction surfaces in any and all positions of the shoes with respect to the shell. Due to the fact that there is clearance provided between the shoes and shell at the meeting portions of the angularly disposed surfaces at both the outer and inner end of the shell and throughout the length of the same, and the curved surfaces 26 of the shoes space themselves a still greater distance from the cooperating portions of the friction shell during the inward travel of the shoes on the shell friction surfaces, there is no possibility of the shoes being lifted off of the shell friction surfaces and consequently there will always be full area contact between the two pairs of flat friction faces 18—18 of the shell 24—24 of each shoe.

It is further pointed out that as the shoes are moved inwardly of the tapered shell, there is no danger of the edges of the shoes gouging into or abrading the shell surfaces at the corner, which if not prevented might start a line of scoring which would so weaken the shell that the outward pressures would soon fracture or disrupt the shell. The clearance provided between the shoes and the shell at the corners of the shell prevent this undesirable imbedding or scoring while permitting the maximum area of contact between the shoe and shell surfaces.

Referring next to the embodiment of the invention, as illustrated in Figure 4, the arrangement of friction shell, friction shoes, wedge block, spring resistance and retainer bolt is substantially the same as that illustrated in Figures 1, 2 and 3, the friction shell being also of hexagonal, transverse section and having three friction shoes cooperating therewith, but the surface portions of the shell which separate each two adjacent pairs of friction surfaces and the corresponding surface portions of the shoes are of different design, as hereinafter pointed out. In Figure 4, the friction shell is designated by A' and two adjacent flat interior friction surfaces thereof are designated by 118—118. The cooperating friction shoe is designated by C' and has wedging engagement with the wedge member, similar to the wedge member B illustrated in Figures 1 and 2. The shoe C' has two flat friction surfaces 124—124, which are angularly arranged with respect to each other similarly to the friction surfaces 24—24 of the shoes C. The friction surfaces 118—118 of the shell are separated by a surface portion 119 of concave formation, the surface 119 being of gradually changing radius from the outer end to the inner end of the shell, the radius being greatest at the outer end thereof. Each shoe is provided with an indented surface portion 120 which separates the flat friction surfaces 124—124 thereof, the indented surface being formed by convex surface portions 121—121 which coalesce with the flat friction surfaces 124—124 and merge with each other. The curvature of the surfaces 121—121 is uniform throughout the length of the shoe. As clearly shown in Figure 4, a substantial clearance is provided between the curved surface portion 119, which connects the adjacent surfaces 118—118 of the friction shell, and the indented surface portion 120 of the shoe which connects the surfaces 124—124. This clearance is maintained throughout the length of the shoe and the friction shell. As will be evident, the clearance provided by the indented surfaces of the shoe C' serves to prevent scoring of the friction shell at the corners thereof and also assures flat frictional contact between the flat friction surfaces of the shoes C' and the shell A' in a manner similar to the shoes C and the cooperating shell A hereinbefore described.

The operation of my improved friction shock absorbing mechanism is as follows: During either a buffing or draft action of the railway draft rigging, the main follower 15 and the combined friction shell and spring cage A will be moved toward each other, thereby forcing the wedge inwardly of the shell and wedging the shoes C—C and D apart and forcing the same inwardly along the friction surfaces of the shell. During this action, movement of the shoes is resisted by the spring E. Due to the converging relation of the shell friction surfaces, a differential action will be set up which slightly accelerates the movement of the shoes. In release action, the collapse of the wedge shoe friction system is insured by reason of the blunt angle faces on the wedge and shoes C—C which in turn permits all of the parts to be moved outwardly to normal position under the influence of the main spring resistance E. Outward movement of the parts is limited by the retainer bolt G.

I have herein shown and described what I now consider the preferred manner of carrying out my invention, but the same is merely illustrative and I contemplate all changes and modifications that come within the scope of the claims appended hereto.

I claim:

1. In a friction shock absorbing mechanism, the combination with a friction shell of substantially hexagonal interior cross section, said shell having six interior flat friction surfaces converging inwardly of the shell and symmetrically arranged about the longitudinal axis thereof, each adjacent pair of flat surfaces being separated by an intermediate, inwardly protruding, rounded surface merging with said flat surface, said merging portion being rounded; three friction shoes, each having a pair of angularly disposed flat friction surfaces having flat surface contact with one of said pairs of shell friction surfaces, said angularly disposed friction surfaces of each shoe being separated by an intermediate curved surface merging with said flat surfaces, said merging portions being rounded and clearance being provided between said protruding rounded surface of the shell and curved surface of the shoe; wedge means cooperating with said shoes; and spring means opposing relative movement of the shoes and shell.

2. In a friction shock absorbing mechanism, the combination with a friction shell of substantially hexagonal, transverse section, said shell having six interior flat friction surfaces converging inwardly of the shell and symmetrically arranged about the longitudinal axis thereof, each adjacent pair of flat surfaces being separated by an intermediate surface of convex formation merging with said flat surfaces, said merging portions being concave and coalescing with said surfaces of convex formation and said flat surfaces; a set of three friction shoes cooperating with said shell surfaces, each shoe having a pair of flat surfaces angularly disposed with respect to each other and having flat surface contact with one of said pairs of shell surfaces, said angularly disposed surfaces of each shoe being separated by a concave surface portion merging with said flat surface portions, said merging portions being of convex formation and coalescing with said flat and concave surfaces.

In witness that I claim the foregoing I have hereunto subscribed my name this 26th day of April, 1930.

WILLIAM A. GEIGER.